US012771051B1

(12) United States Patent
Bakowski et al.

(10) Patent No.: US 12,771,051 B1
(45) Date of Patent: Oct. 20, 2026

(54) HIGH-TEMPERATURE FIBER FABRIC-INSULATED ELECTRICAL BUSHING

(71) Applicants: Matthew A. Bakowski, Springdale, AR (US); Jacob P. Kupernik, Bella Vista, AR (US)

(72) Inventors: Matthew A. Bakowski, Springdale, AR (US); Jacob P. Kupernik, Bella Vista, AR (US)

( * ) Notice: Subject to any disclaimer, the term of this patent is extended or adjusted under 35 U.S.C. 154(b) by 217 days.

(21) Appl. No.: 18/793,136

(22) Filed: Aug. 2, 2024

Related U.S. Application Data

(60) Provisional application No. 63/532,103, filed on Aug. 11, 2023.

(51) Int. Cl.
*H01R 12/00* (2006.01)
*H01B 17/26* (2006.01)
(Continued)

(52) U.S. Cl.
CPC ............ *H01R 12/53* (2013.01); *H01B 17/26* (2013.01); *H01R 4/28* (2013.01)

(58) Field of Classification Search
CPC .......... H01R 12/57; H01R 12/58; H01R 4/70; H01R 12/515; H01R 12/616; H01R 12/675; H01R 13/40; H01R 31/02; H01R 4/185; H01R 4/2429; H01R 4/2466; H01R 11/01; H01R 12/53; H01R 12/71; H01R 12/77; H01R 12/79; H01R 13/02; H01R 13/502; H01R 13/5216; H01R 13/533; H01R 13/6592; H01R 13/6658; H01R 2201/16; H01R 24/62; H01R 4/14; H01R 4/18; H01R 4/20; H01R 4/2404; H01R 4/2475; H01R 4/30; H01R 4/38; H01R 4/4821; H01R 43/005; H01R 11/32; H01R 12/62; H01R 12/7023; H01R 12/714; H01R 12/716; H01R 12/727; H01R 12/75; H01R 12/771; H01R 12/87; H01R 13/24; H01R 13/33; H01R 13/46; H01R 13/5845; H01R 13/6273; H01R 13/6276; H01R 13/6466; H01R 13/658; H01R 13/7033; H01R 13/7038; H01R 13/719; H01R 2105/00;
(Continued)

(56) References Cited

U.S. PATENT DOCUMENTS

| | | |
|---|---|---|
| 2,759,092 A | 8/1956 | Fortin |
| 3,160,790 A | 12/1964 | Mittler |

(Continued)

OTHER PUBLICATIONS

R. Kulke, et al., "High level of integration for Bluetooth modules on LTCC," in IMAPS Europe EMPC Conference, 2003, p. 16.

(Continued)

*Primary Examiner* — Pete T Lee
(74) *Attorney, Agent, or Firm* — Keisling & Pieper PLC; Trent C. Keisling; David B. Pieper

(57) ABSTRACT

A high temperature electrical connection for a high temperature wire to a ceramic wiring board including a conductor using a pass through ceramic fabric with a first penetration point positioned proximate to and aligning with the first conductor where the wire is woven into the first penetration point and held by a clamp applying pressure to the pass through ceramic fabric and the wire at the first penetration point.

8 Claims, 8 Drawing Sheets

(51) Int. Cl.
*H01R 4/28* (2006.01)
*H01R 12/53* (2011.01)

(58) Field of Classification Search
CPC .......... H01R 24/64; H01R 3/08; H01R 4/028; H01R 4/029; H01R 4/24; H01R 4/2425; H01R 4/2433; H01R 4/2437; H01R 4/2441; H01R 4/2495; H01R 4/4823; H01R 4/4848; H01R 4/5033; H01R 43/01; H01R 43/02; H01R 43/0256; H01R 43/058; H01R 9/03; H01R 9/031; H01R 9/0527; H01R 9/2458; H01R 9/2491; H01R 9/28
See application file for complete search history.

(56) References Cited

U.S. PATENT DOCUMENTS

| | | | | |
|---|---|---|---|---|
| 4,596,053 | A | 6/1986 | Cohen et al. | |
| 4,820,170 | A | 4/1989 | Redmond et al. | |
| 5,601,673 | A | 2/1997 | Alexander | |
| 5,657,532 | A | 8/1997 | Alexander et al. | |
| 5,661,882 | A | 9/1997 | Alexander | |
| 5,714,246 | A | 2/1998 | Shaikh et al. | |
| 6,686,665 | B1 | 2/2004 | Gao et al. | |
| 6,736,674 | B2 * | 5/2004 | Korte | H01R 9/0527 439/578 |
| 7,271,028 | B1 | 9/2007 | Pace | |
| 7,547,369 | B2 | 6/2009 | Khadilkar et al. | |
| 7,666,328 | B2 | 2/2010 | Nair et al. | |
| 7,806,974 | B2 | 10/2010 | Hwang et al. | |
| 7,952,107 | B2 | 5/2011 | Daniels et al. | |
| 8,043,721 | B2 | 10/2011 | Khadilkar et al. | |
| 8,389,867 | B2 | 3/2013 | Enomoto et al. | |
| 8,413,321 | B2 | 4/2013 | Brunner et al. | |
| 9,123,705 | B2 | 9/2015 | Blanchard et al. | |
| 9,565,772 | B2 | 2/2017 | Sakoske et al. | |
| 9,631,106 | B2 | 4/2017 | Maaninen et al. | |
| 9,803,098 | B2 | 10/2017 | Cho et al. | |
| 9,899,298 | B2 | 2/2018 | Vincent et al. | |
| 11,217,659 | B1 | 1/2022 | Barlow et al. | |
| 2005/0161682 | A1 | 7/2005 | Mazzochette et al. | |
| 2007/0141903 | A1 * | 6/2007 | Casperson | H01R 13/6658 439/582 |
| 2009/0315057 | A1 | 12/2009 | Konishi et al. | |
| 2010/0323533 | A1 * | 12/2010 | Bishop | H01R 4/4821 439/55 |
| 2011/0186336 | A1 | 8/2011 | Nakayama | |
| 2012/0155044 | A1 | 6/2012 | Shaddock et al. | |
| 2012/0305296 | A1 | 12/2012 | Gordon et al. | |
| 2015/0115451 | A1 | 4/2015 | Viswanathan | |
| 2017/0019990 | A1 | 1/2017 | Takemura et al. | |
| 2021/0121101 | A1 | 4/2021 | Singhala et al. | |

OTHER PUBLICATIONS

"LTCC Product Technical Information: Dupont Microcircuit Materials." [Online], Available: http://www2.DUPONT.com/MCM/en_US/tech_info/products/ltcc.html. [accessed: Nov. 25, 2014].

J.J. Steppan, J.A. Roth, L.C. Hall, D.A. Jeannotte, and S.P. Carbone, "A Review of Corrosion Failure Mechanisms during Accelerated Tests Electrolytic Metal Migration," J. Electrochem. Soc., vol. 134, No. 1, pp. 175-190, Jan. 1987.

J.E. Naefe, R.W. Johnson, and R.R. Grzybowski, "High-temperature storage and thermal cycling studies of thick film and wirewound resistors," IEEE Trans. Compon. Packag. Technol., vol. 25, No. 1, pp. 45-52, Mar. 2002.

G.J. Kahan, "Silver Migration in Glass Dams between Silver-Palladium Interconnections," IEEE Trans. Electr. Insul., vol. EI-10, No. 3, pp. 86-94, Sep. 1975.

G.Q. Lu, W. Yang, Y. Mei,X Li, G. Chen, and X. Chen, "Effects of D bias and spacing on migration of sintered nanosilver at high temperatures for power electronic packaging," in 2013 14th International Conference on Electronic Packaging Technology, ICEPT, 213, pp. 925-930.

Y. Mei, G.Q. Lu, X. Chen, S. Luo, and D. Ibitayo, "Effect of Oxygen Partial Pressure on Silver Migration of Low-Temperature Sintered Nanosilver Die-Attach Material," IEEE Trans. Device Mater. Reliab., vol. 11, No. 2, pp. 312-315, Jun. 2011.

G.Q. Lu, W. Yang, Y.H. Mei, X. Li, G. Chen, and X. Chen, "Migration of Sintered Nanosilver on Alumina and Aluminum Nitride Substrates at High Temperatures in Dry Air for Electronic Packaging," IEEE Trans. Device Mater. Reliab., vol. 14, No. 2, pp. 600-606, Jun. 2014.

* cited by examiner

HIGH-TEMPERATURE FIBER FABRIC-INSULATED ELECTRICAL BUSHING

CROSS-REFERENCE TO RELATED APPLICATIONS

This application claims priority to and is a continuation-in-part of U.S. Patent Application Ser. No. 63/532,103, filed on Aug. 11, 2023 entitled High-Temperature Fiber Fabric-Insulated Electrical Bushing which is hereby incorporated by reference in its entirety.

FEDERALLY SPONSORED RESEARCH AND DEVELOPMENT

This invention was made with government support under grant number DE-SC0022589 awarded by Department of Energy. The government has certain rights in the invention. DE-SC0022589 P1 Mhometer (153) Title: High-Temperature Electronics for Low-Cost, In-Line Impurity Monitoring of Salt-Cooled Reactors (Mhometer). SBIR FY-2022 Phase-I Release-2 DE-FOA-0002555.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

PRIOR ART

Patents disclosing information relevant to electrical items and fabrics include: U.S. Pat. No. 2,759,092, issued to Fortin on Aug. 14, 1956; U.S. Pat. No. 3,160,790, issued to Mittler on Dec. 8, 1964; U.S. Pat. No. 4,596,053, issued to Cohen, et al. on Jun. 24, 1986; and U.S. Pat. No. 4,820,170, issued to Redmond, et al. on Apr. 11, 1989.

U.S. Pat. No. 2,759,092, issued to Fortin on Aug. 14, 1956 describes an electrical heating unit for a toaster. This patent discusses "(15) The heating unit shown in FIG. 1 of the drawing consists of a piece of electrically conductive woven wire fabric, the top and bottom edges of which are fixed between the opposing plates of clamps 10. The fabric may be woven in a long ribbon and then cut into pieces of desired length, one for each heating unit. Glass, yarn threads 1.1 form the warp of this fabric, a single 'continuous wire 12 of low resistance conductive material, such as copper, being interwoven with the glass yarn threads. . . . The ends of the woven wire fabric may be welded, or soldered with a high melting point solder, between the opposing clamp plates, if desired; and the leading conductors from the power supply may be fastened to the clamps, one at the top and the other at the bottom in like manner, if desired."

U.S. Pat. No. 3,160,790, issued to Mittler on Dec. 8, 1964 consists "of a woven composition formed by weaving conductive threads and insulative threads into a conductive fabric by existing textile methods. . . . The fabric thus formed may be supplied to the circuit assembler in the manner that conventional piece goods are supplied to a garment manufacturer, i.e. in strip form, rolled for convenience in handling. The fabric will, however, be covered with conductive patterns and individual circuits may be obtained therefrom by selectively cutting said strips. . . . The insulative threads that are utilized for this purpose should be highly temperature resistant and fiber glass, which is stable at temperatures above 1000° F., is highly recommended. Aside from being one of the best electrical insulating materials, fiber glass is fire proof, acid resistant, will not mildew or warp and its fiber have tensile strength at 220,000 p.s.i."

U.S. Pat. No. 4,596,053, issued to Cohen, et al. on Jun. 24, 1986, which states in the abstract: "A static control garment having torso and limb covering portions with first electrically conductive means in the garment positioned at a limb covering portion adapted to attach to a conductive strap, that encircles a limb of the body, second electrically conductive means in the garment positioned at a torso covering portion adapted to attach to electrical grounding means, and this electrically conductive means interconnecting the first and second electrically conductive means."

U.S. Pat. No. 4,820,170, issued to Redmond, et al. on Apr. 11, 1989, which states in the abstract: "Provided herein are novel layered elastomeric connectors, housings therefor and methods of manufacture for the connectors which includes alternating fused layers of a dielectric elastomer and electrically conductive fibrous mats coextensive with a cross section of the conductor to provide a multiplicity of conductive pathways between two electrically conductive surfaces."

U.S. Pat. No. 9,860,982, issued to Main, et al. on Jan. 2, 2018, which states in the abstract: "A process makes electrical connections between electrical wires and flexible conductive elements, such as conductive fabrics. The process makes strong electrical connections that are mechanically flexible and can simultaneously create multiple electrical connections. The process involves creating an assembly that includes at least a TPE layer, an electrical wire, an insulating layer, and a flexible conductive element, and applying heat and pressure to the assembly. For example, a conductive fabric is disposed on an insulating layer, a wire is positioned onto a surface of the insulating layer, and a TPE layer is disposed over the wire and overlaps the conductive fabric element. When applying the heat and pressure, the wire melts through the insulating layer to make electrical contact with the conductive fabric element, and the TPE layer conforms to an exterior of the wire and bonds to the insulating layer."

Each of these patents is hereby expressly incorporated by reference in its entirety. These prior art references teach that wires can be embedded in flexible fabrics for heating and conductive elements but fail to provide for a high temperature connection for ceramic circuit boards. Thus, it may be seen that these prior art patents are very limited in their teaching and utilization, and improved wire to board electrical connections are needed to overcome these limitations.

BACKGROUND OF THE INVENTION

Connecting high-temperature, above 300 degrees Celsius, rated metal conductors to high-temperature rated printed ceramic wiring boards introduces a materials mismatch in thermal expansion and in contact resistance. Fired ceramic insulated connectors present manufacturing yield issues with statistical distributions in the asymmetry in shrinkage during firing. Metal-spring loaded contact or connector systems present a reliability issue at high temperature where the spring constant is muted.

SUMMARY OF THE INVENTION

The present invention relates to improvements in electrical circuit connections for use at high operating temperatures, above three hundred degrees Celsius. More particularly, the invention relates to improvements particularly suited for providing reliable high temperature connections that can withstand different thermal expansion characteristics and still provide low resistance. The present invention is directed to an improved electrical connection using a clamping system for a high temperature wire to a ceramic wiring board including a conductor by using a pass through ceramic fabric with a first penetration point positioned proximate to and aligning with the first conductor where the wire is woven into the first penetration point and held by a clamp applying pressure to the pass through ceramic fabric and the wire at the first penetration point. In this manner, the ceramic fabric acts as the spring to maintain the clamping pressure, and encases the wire to provide side stability and longitudinal stability to movements in directions other than clamping pressure direction, and still provides for the differences in the thermal expansion characteristics. Thus, because of the nature of the ceramic fabric, high operating temperature capabilities are provided along with wire alignment, vibrational damping, and repeatable manufacturing capabilities.

DETAILED DESCRIPTION OF THE INVENTION

Figure 1:
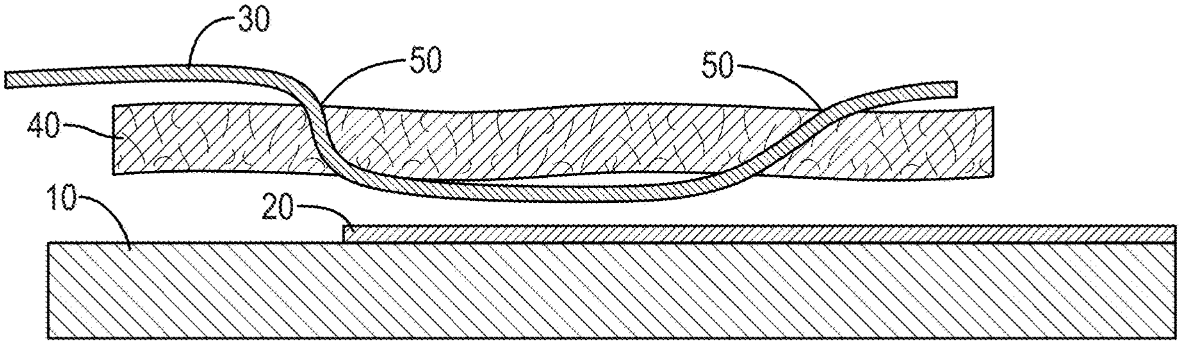
FIG. 1 shows a cross-section of high-temperature wire woven into ceramic fabric.

As shown in FIGS. 1-8 of the drawings, one exemplary embodiment of the present invention is generally shown as a ceramic fabric wire to board compression connection 100. A ceramic wiring board 10 with a board top 12, board bottom 14, board edge 16, and board aperture 18 (not shown) is used. The ceramic wiring board 10 is printed on the board top 12 with high-temperature conductors 20. The high-temperature conductors 20 include a conductor top 22, conductor bottom 24, conductor end 26, at a conductor connection location 28.

A high-temperature wire 30 is then provided with a conducting core body 32, armored and/or insulated jacket 34, approaching body pass through segment 35, exposed conducting core contact segment 36, departing pass through segment 37, and wire end 38. Also provided is a pass through ceramic fabric 40 with a pass through bottom 42, pass through body 44, pass through thickness 45, pass through top 46, and pass body edge 48. The high-temperature wire 30 is woven through (shown as a vertical penetration) the pass through ceramic fabric 40 encasing the wire 30 and thereby fixing the wire-to-conductor exposure at the design fabrication penetration points 50. Both an approaching penetration point 52 and a departing penetration point 54 are shown, although only one may be utilized with the approaching penetration point 52 being the preferred penetration. When a second wire 30 and second conductor 20 are provided, the same wire parts are in installed in the same manner, just positioned at the second conducting location to provide a signal wire fanout 150 with appropriate conductor spacing 160.

A ceramic insulating fabric 60 may be selectively used when appropriate with an insulating bottom 62, insulating body 64, insulating thickness 65, insulating top 66, and insulating body edge 68 positioned at an insulation location 69. The additional layer of ceramic insulating fabric 60 is added to electrically insulate the high-temperature wires 30 from high-temperature metal upper clamp head 80.

A pressure fastener 90 is then used with an upper force connection 92, and pressure application body 94, and lower force connection 96. The pressure application body 94 applies the pressure between the upper force connection 92 and lower force connection 96. This can be done as a through bolt style of clamp or as a side mounted clamp such as a C-style clamp where the upper clamp head 80 is mechanically connected to the lower clamp head 70 with a pressure fastener 90 beyond the edges of the ceramic wiring board 10 or through the bard 10 as a through hole fastener offset from the wire 30. Both clamping styles use a lower clamp head 70 including a lower clamp bottom 72, lower clamp body 74, lower clamp thickness 75, lower clamp top clamp 76, and lower clamp body edge 78 and an upper clamp head 80 having an upper clamp bottom 82, upper clamp body 84, upper clamp thickness 85, upper clamp top clamp 86, and upper clamp body edge 88. When used as a pass through, a lower clamp aperture 79 (not shown) and upper clamp aperture 89 (not shown) are used for the pass through of the board 10, and fabrics 40, 60 and is laterally offset from the wire 30 as necessary for insulating for both temperature and electrical properties.

The pass through ceramic fabric 40 and ceramic insulating fabric 60 are high-temperature fiber fabrics, either loomed or felted fiber, materials for a generally applicable, low cost, and eminently prototype-able solution to the wire-to-board problem. The fabric 40, 60 acts both as a dielectric and introduces a mechanically compliant bushing to alleviate stresses applied to the ceramic wiring board 10 resulting from disparate thermal expansion of connector components 10, 20, 30 and simplifies the assembly process by being able to use standardized connector parts and reversable assembly steps. The fabric bushing 40, 60 acts also as a cushion between electrical contacts and absorbs vibration and differences in the thermal expansion of the connector materials. Materials for the cloth or fabric bushing 40, 60 include polyamide felts suitable for service up to 300° C. such as NOMEX fabric, NOMEX is a trade mark of DuPont Safety & Construction, Inc. a Delaware Corporation with an address of 974 Centre Rd., Wilmington Delaware 19805, and mineral fabrics cush as zirconia and alumina which are suitable for service up to 1000° C.

The fabric connector architecture for the compression connection 100 consists of the compliant fabric transition component 40, and/or 60, clamped directly to the ceramic wiring board 10, and controls the signal wire fanout 150 and conductor spacing 160 by controlling the separation at the penetration points 50, The wires 30 can ultimately terminate with a commercially-available-off-the-shelf, COTS, or other rigid connector for wire-to-wire connections.

Figure 2:
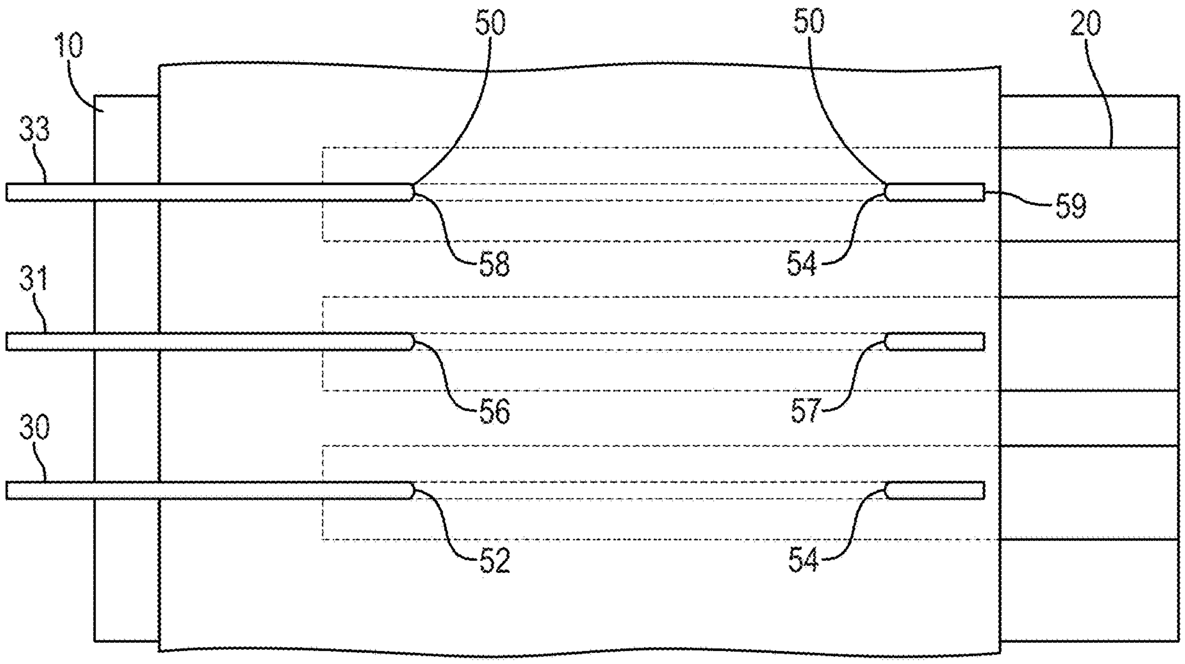
FIG. 2 is a top view of multiple high-temperature wires woven into ceramic fabric to match spacing of high-temperature printed conductors on ceramic wiring board.

FIG. 1 diagrams the cross-section of the invention with the high-temperature wire woven 30 into pass through ceramic fabric 40. FIG. 2 provides a top view of the invention showing multiple high-temperature wires 30 woven into the pass through ceramic fabric 40 to match the spacing of high-temperature printed conductors 20 on the ceramic wiring board 10.

Figure 3:
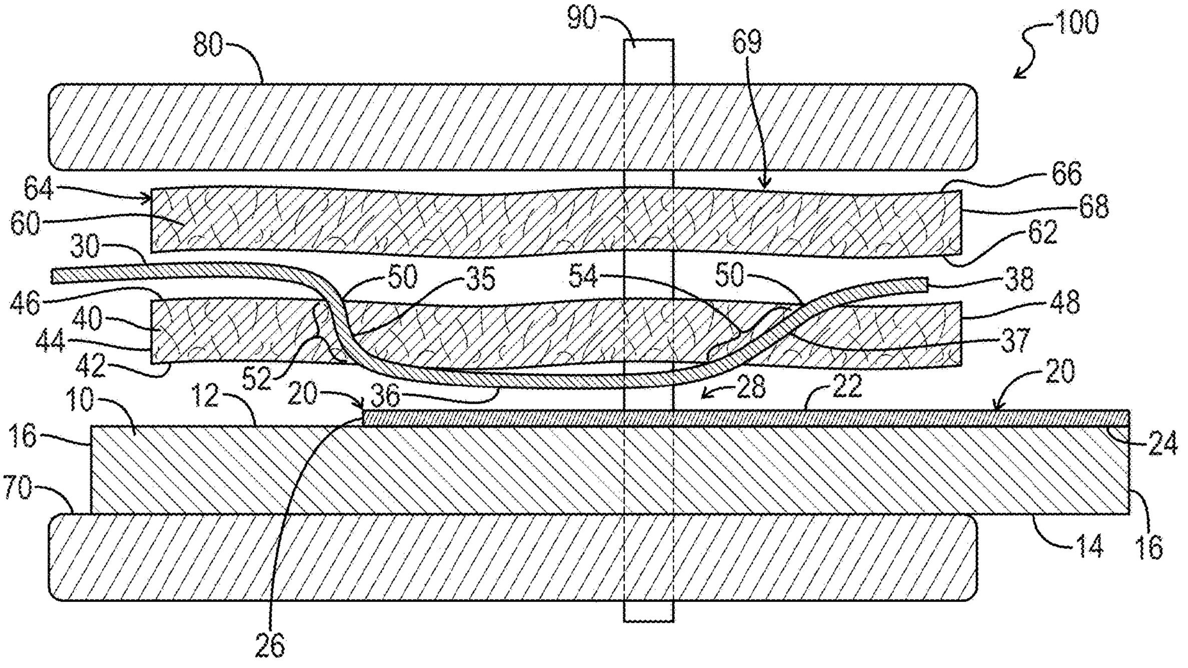
FIG. 3 shows a schematic cross-section of woven ceramic connector with ceramic fabric top insulator and metal compression plates and fastener pre-compression
Figure 4:
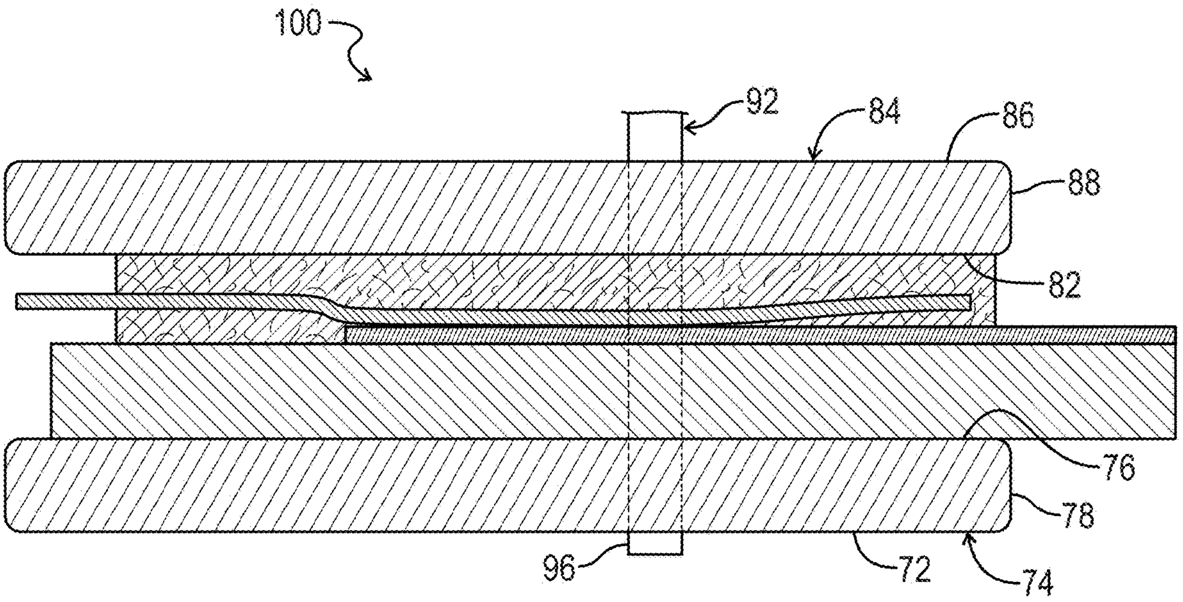
FIG. 4 shows a post-compressed assembly cross-section.

The cross-section of the completed connector is shown in FIG. 3 in its pre-compressed assembly. The pre-compressed assembly includes the wire to board connector discussed in FIG. 1 with the ceramic wiring board 10, high-temperature conductors 20, high-temperature wire 30, pass through ceramic fabric 40, and the fabrication penetration points 50, and FIG. 3 also shows the insulated clamping assembly with an additional layer of ceramic fabric 60 added to electrically insulate the high-temperature wires from high-temperature metal upper clamp head 80, and lower clamp head 70, and pressure fastener 90. The through hole pressure fastener 90 is connected and applies clamping pressure to the high-temperature metal upper clamp head 80 and lower clamp head 70. In this manner, a wire woven ceramic connector 100 is shown with a ceramic fabric top insulator 60 and metal compression plates 80, 70 in a pre-compression state. FIG. 4 then shows the post-compressed assembly cross-section with ceramic fabric top insulator 60, compression plates 70, 80 and pressure fastener 90.

Figure 5:
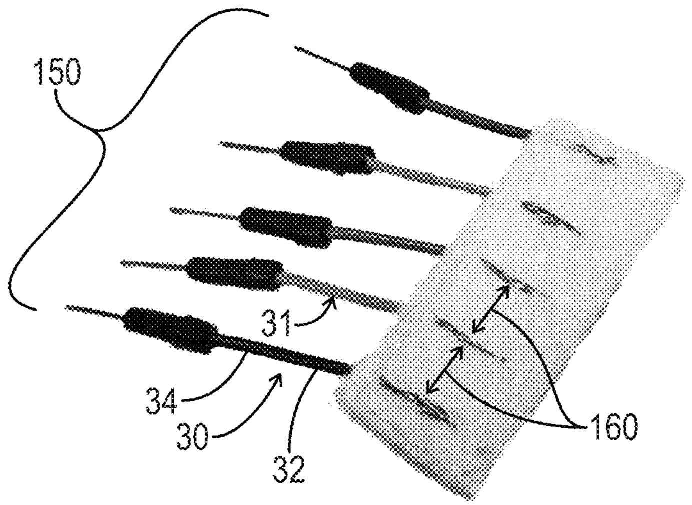
FIG. 5 shows a prototype of the invention using materials rated to 85° C.
Figure 6:
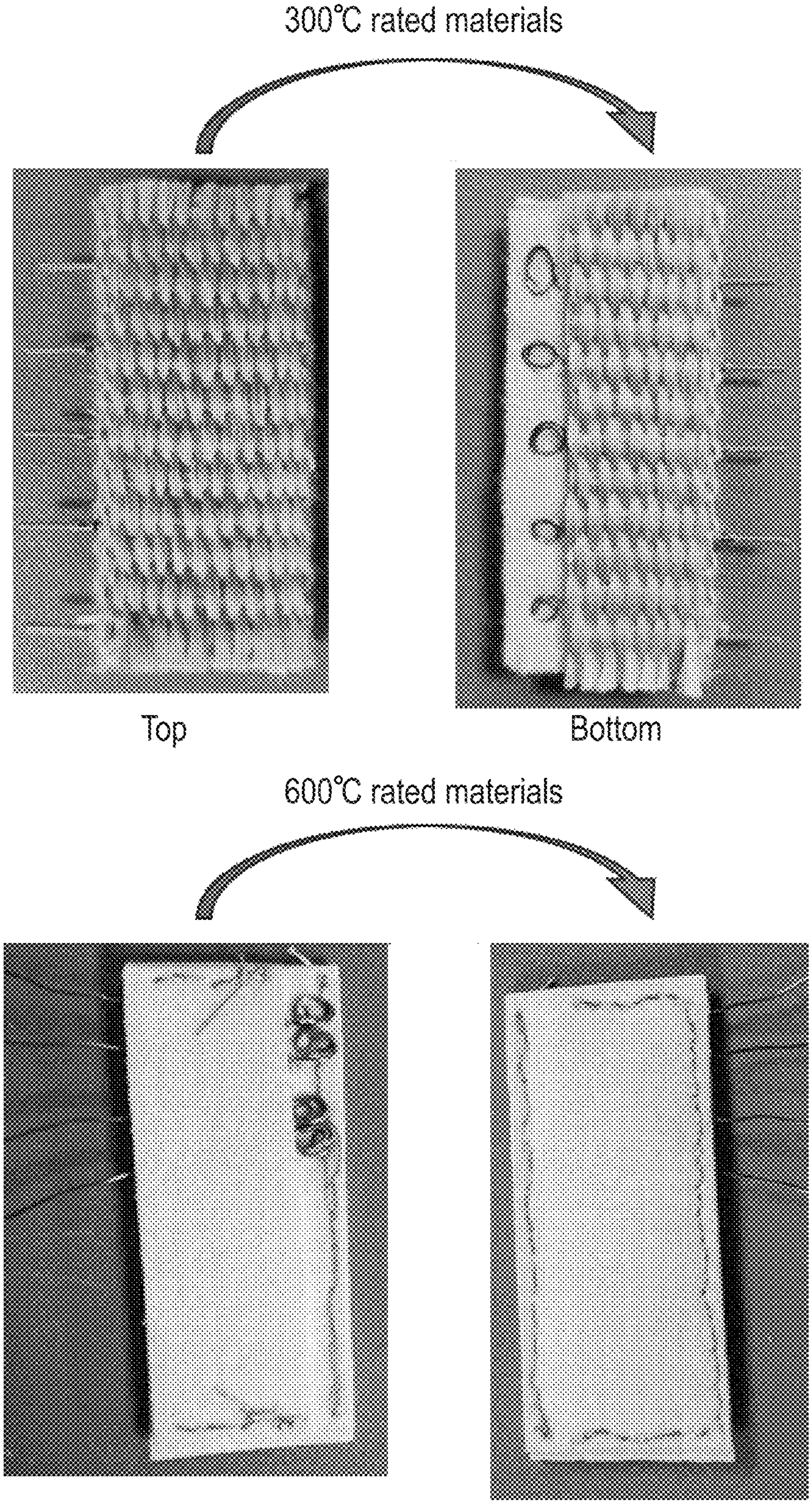
FIG. 6 shows fabric connectors made from materials rated to 300° C. and 600° C., each connector photographed top and bottom surface.

FIG. 5 shows a first prototype of the invention using materials rated to 85° C., and FIG. 6 shows prototypes created using materials rated to 300 C and 500 C respectively with each connector photographed top and bottom surface.

Figure 7:
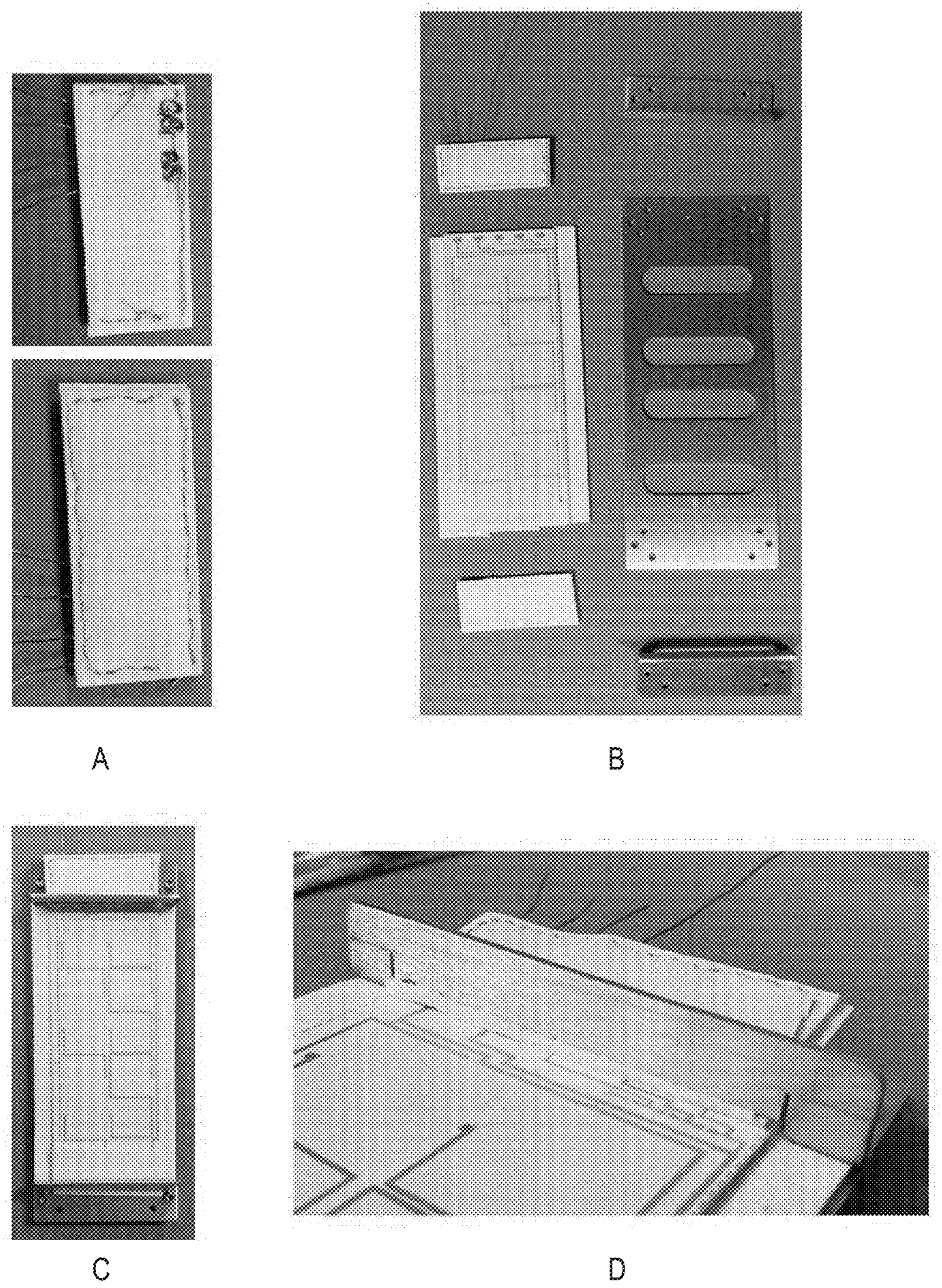
FIG. 7 shows assembly of a removeable fabric-insulated connector with high-temperature ceramic wiring board test circuit with (A) Fabric-insulated connector photographed top and bottom, (B) test circuit and connector components, (C) assembled fabric-insulated connector and ceramic wiring board, and (D) compressive loading of fabric-insulated connector to ceramic wiring board.
Figure 8:
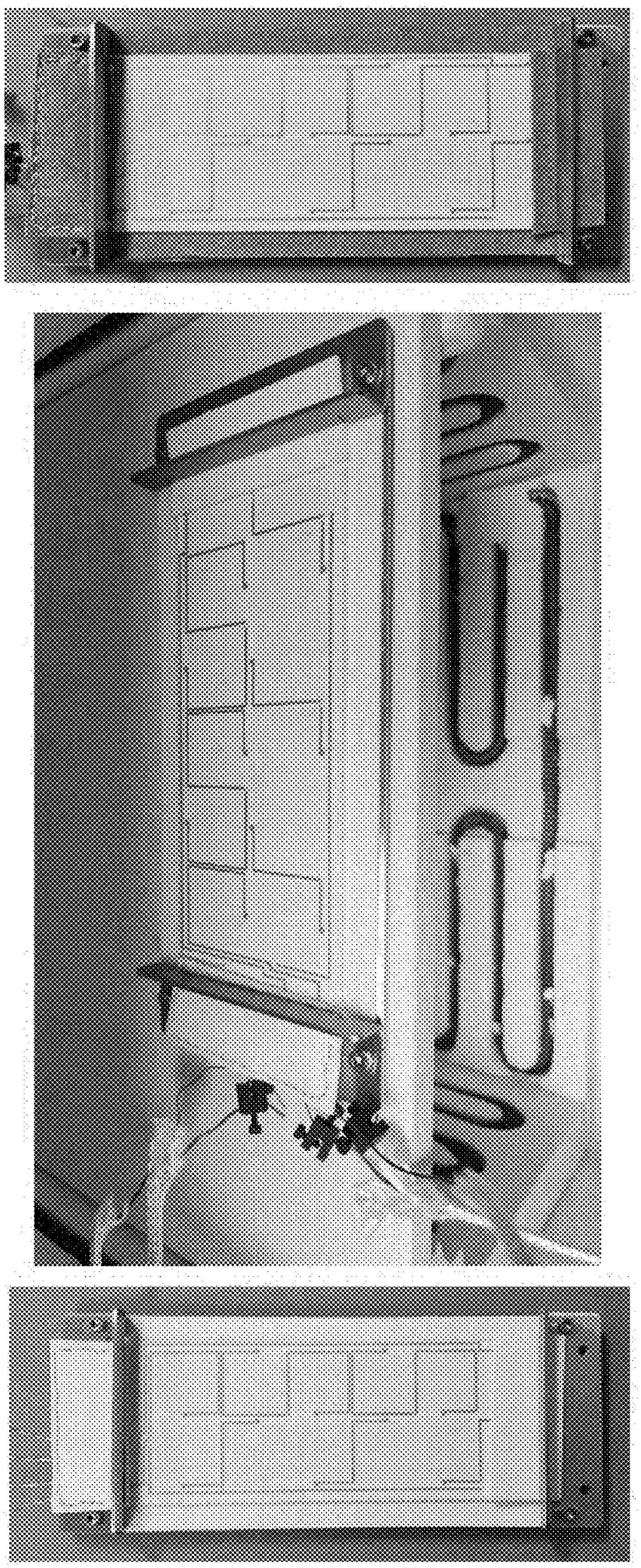
FIG. 8 shows a fabric-insulated connector test assembly before 400° C. thermal cycling (left), fabric-insulated connector test circuit in muffle furnace (center), and fabric-insulated connector and test board after 400° C. temperature cycling (right).

FIG. 7 shows assembly of removeable fabric-insulated connectors 100 with high-temperature ceramic wiring board 10 test circuit. FIG. 7(A) shows the fabric-insulated connector 100 photographed top and bottom. FIG. 7(B) shows the test circuit and connector components. FIG. 7(C) shows the assembled fabric-insulated connector and ceramic wiring board. FIG. 7(D) shows the compressive loading of fabric-insulated connector to ceramic wiring board. The invention was tested in a muffle furnace from room temperature, approximately 20° C. to 400° C. and back to room temperature. Organic compounds used in the fabric manufacturing process were oxidized causing the fabric to change color. There was no measurable change in the electrical isolation from one connector wire to another. FIG. 8 shows the fabric-insulated connector test assembly before 400° C. thermal cycling (left) fabric-insulated connector test circuit in muffle furnace (center), fabric-insulated connector and test board after 400° C. temperature cycling (right).

Reference Numerals Used Throughout the Detailed Description and the Drawings Correspond to the Following Elements:

ceramic wiring board 10
board top 12
board bottom 14
board edge 16
board aperture 18 (not shown)
high-temperature conductors 20
conductor top 22
conductor bottom 24
conductor end 26
conductor connection location 28
first high-temperature wire 30
second high-temperature wire 31
conducting core body 32
third high temperature wire 33
insulated jacket 34
approaching body pass through segment 35
exposed conducting core contact segment 36
departing pass through segment 37
wire end 38
pass through ceramic fabric 40
pass through bottom 42
pass through body 44
pass through thickness 45
pass through top 46
pass body edge 48
fabrication penetration points 50
first wire approaching penetration point 52
first wire departing penetration point 54
second wire approaching penetration point 56
second wire departing penetration point 57
third wire approaching penetration point 58
third wire departing penetration point 59
ceramic insulating fabric 60
insulating bottom 62
insulating body 64
insulating thickness 65
insulating top 66
insulating body edge 68
insulation location 69
lower clamp head 70
lower clamp bottom 72
lower clamp body 74
lower clamp thickness 75
lower clamp top 76
lower clamp body edge 78
lower clamp aperture 79 (not shown)
upper clamp head 80
upper clamp bottom 82
upper clamp body 84
upper clamp thickness 85
upper clamp top 86
upper clamp body edge 88
upper clamp aperture 89 (not shown)
pressure fastener 90
upper force connection 92
pressure application body 94
lower force connection 96
compression connector 100
signal wire fanout 150
conductor spacing 160

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

The invention claimed is:

1. A high temperature electrical connection, comprising:
- a first high temperature wire;
- a ceramic wiring board including a first conductor;
- a pass through ceramic fabric;
- the pass through ceramic fabric defining a first penetration point penetration point positioned proximate to and aligning with the first conductor;
- the first high temperature wire including a first body pass through segment positioned in the first penetration point and a first exposed conducting core segment; and
- a clamp applying pressure to the first conductor, the first exposed conducting core segment, and the pass through ceramic fabric.

2. The high temperature electrical connection of claim 1, further comprising:
- the first penetration point is an approaching penetration point.

3. The high temperature electrical connection of claim 1, further comprising:
- the first penetration point is a departing penetration point.

4. The high temperature electrical connection of claim 1, further comprising:
- the pass through ceramic fabric defining a departing penetration point positioned proximate to and aligning with the first conductor;
- the first high temperature wire including a second body pass through segment positioned in the departing penetration point.

5. The high temperature electrical connection of claim 1, further comprising:
- the first high temperature wire including an end pass through segment.

6. The high temperature electrical connection of claim 1, further comprising:
- a second high temperature wire positioned at a conductor spacing from the first high temperature wire.

7. The high temperature electrical connection of claim 1, further comprising:
- the clamp including a lower clamp head and an upper clamp head connected by a pressure fastener.

8. The high temperature electrical connection of claim 1, further comprising:
- a ceramic insulating fabric positioned between the high temperature wire and the clamp.

* * * * *